UNITED STATES PATENT OFFICE.

GEORG BOLDT, OF CHICAGO, ILLINOIS.

IMPROVED FULMINATING COMPOSITION.

Specification forming part of Letters Patent No. 56,167, dated July 10, 1866.

*To all whom it may concern:*

Be it known that I, GEORG BOLDT, of Hanover, now resident of Chicago, in the county of Cook and State of Illinois, have invented a Fulminating Substance to Ignite Cartridges; and I do hereby declare that the following is a full and exact description thereof, reference being had to the accompanying specimens.

The object of my invention is to produce a fulminating substance with which to fill the cavities in the back part of conical or other projectiles to be used in fire-arms of particular construction—such, for instance, as the Prussian *Zünd-nadel* rifle, where a needle worked by proper mechanism pierces the cartridge from behind and, passing through its powder, strikes the fulminating substance filling the cavity in the hind part of the bullet, ignites it by concussion or friction, and thus ignites the cartridge itself.

To enable others skilled in the art to make and use my invention, I will describe its preparation.

I make, first, a preparation of fulminating-silver in the following way: I take one (1) part, in weight, of mercury and solve it in ten (10) parts of nitric acid; leave it to stand twenty-four hours, and shaking it often; then I put this solution into a porcelain vessel and warm it strongly on a spirit-lamp. I add to this warmed solution twelve (12) parts of alcohol, and boil well the whole together; then I cool it down, pour out, and dry. This constitutes the fulminating-silver. I take two (2) parts, in weight, of flowers of sulphur and three (3) parts of tin, melt them together, and when cooled grind them into powder. This constitutes the sulphur-tin. After that, in order to make my fulminating substance, I take, in weight, fifteen (15) parts of fulminating-silver, one and a half (1½) parts of sulphur-tin, three (3) parts of fine powder-flour, and one (1) part of finely-powdered charcoal. Put all these ingredients into a porcelain mortar and mix them finely with a wooden pest'e; then I add enough of gum-water (one (1) part of gum-arabic diluted in one hundred (100) parts of water) to make a somewhat dampish paste of the mixture, so as to have it easily pressed into the cavity of bullets, and the fulminating substance is ready.

What I claim as my invention, and desire to secure by Letters Patent, is—

A fulminating substance to ignite cartridges by filling with it small cavities in the back part of conical projectiles and using an igniting-needle, said fulminating substance consisting of the ingredients above enumerated, and prepared and mixed as above described and specified.

GEORG BOLDT.

Witnesses:
CHARLIE FOWLER,
SAML. J. FRAZIER.